United States Patent
Corey et al.

(10) Patent No.: US 11,086,661 B2
(45) Date of Patent: Aug. 10, 2021

(54) CONTAINER CHAINING FOR AUTOMATED PROCESS COMPLETION

(71) Applicant: INTERNATIONAL BUSINESS MACHINES CORPORATION, Armonk, NY (US)

(72) Inventors: Geoffrey W. Corey, Fuquay Varina, NC (US); Michael D. Elder, Durham, NC (US); Michael S. Mckay, Cary, NC (US); Daniel D. K. Stratton, Chapel Hill, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 7 days.

(21) Appl. No.: 16/414,920

(22) Filed: May 17, 2019

(65) Prior Publication Data

US 2019/0272199 A1 Sep. 5, 2019

Related U.S. Application Data

(63) Continuation of application No. 15/475,230, filed on Mar. 31, 2017, now Pat. No. 10,387,199.

(51) Int. Cl.
*G06F 9/48* (2006.01)
*G06F 9/50* (2006.01)

(52) U.S. Cl.
CPC .......... *G06F 9/4843* (2013.01); *G06F 9/5005* (2013.01)

(58) Field of Classification Search
CPC .................................................... G06F 9/5005
See application file for complete search history.

(56) References Cited

U.S. PATENT DOCUMENTS

| 8,930,899 | B2 | 1/2015 | Chan et al. |
| 9,916,233 | B1 * | 3/2018 | Qureshi .............. G06F 9/45533 |
| 9,983,891 | B1 * | 5/2018 | Christensen .............. G06F 8/63 |
| 2006/0212857 | A1 | 9/2006 | Neumann et al. |

(Continued)

OTHER PUBLICATIONS

IBM, "Method and Apparatus for Packaging Software Components", IP.com No. IPCOM000144121D, Dec. 18, 2006, 8 pgs.

(Continued)

*Primary Examiner* — Sisley N Kim
(74) *Attorney, Agent, or Firm* — Brian Restauro; Matthew M. Hulihan; Heslin Rothenberg Farley & Mesiti PC

(57) ABSTRACT

A method obtains a configuration for an automated process that includes discrete tasks. The configuration specifies a corresponding container image, of a plurality of different container images, for each discrete task of the discrete tasks, and further specifies a sequence in which to instantiate a plurality of containers from the plurality of container images to perform the discrete tasks and complete the automated process. The method identifies from the configuration a next container image from which to instantiate a next container for execution to perform a next discrete task, the next discrete task corresponding to the next container image and next container instantiated from the next container image. The method initiates instantiation of the next container from the next container image to initiate execution of the container to perform the next discrete task. The method also repeats the identifying and the initiating instantiation for each next container image.

15 Claims, 6 Drawing Sheets

(56) References Cited

U.S. PATENT DOCUMENTS

| | | | |
|---|---|---|---|
| 2008/0127136 A1 | 5/2008 | Hino et al. | |
| 2013/0191830 A1* | 7/2013 | Mann .................. | G06F 9/54 |
| | | | 718/1 |
| 2016/0170743 A1 | 6/2016 | Shmulevich et al. | |
| 2016/0253625 A1 | 9/2016 | Casey | |
| 2016/0359955 A1* | 12/2016 | Gill .................. | H04L 67/10 |
| 2017/0147319 A1* | 5/2017 | Riek .................. | H04L 67/06 |
| 2017/0180346 A1* | 6/2017 | Suarez .................. | G06F 8/71 |
| 2018/0248770 A1* | 8/2018 | Regmi .................. | H04L 41/145 |
| 2018/0285156 A1 | 10/2018 | Corey et al. | |

OTHER PUBLICATIONS

Anonymous, "A Method and Mechanism for Intelligent Container Images Assembling in Cloud Environment," IP.com No. IPCOM000242848D, Aug. 25, 2015, 9 pages.

Mell, Peter, et al., "The NIST Definition of Cloud Computing", NIST Special Publication 800-145, Sep. 2011, Gaithersburg, MD, 7 pgs.

TravisCI—Test and Deploy Your Code with Confidence, available at: https://travis-ci.org (last accessed Mar. 30, 2017), 10 pages.

List of IBM Patents or Applications Treated as Related, May 17, 2019, 2 pgs.

* cited by examiner

CONTAINER CHAINING FOR AUTOMATED PROCESS COMPLETION

BACKGROUND

Some processes performed by computer systems proceed as a sequence of discrete tasks. For software builds and deployments, for example, the discrete tasks include extracting the code, running build scripts, running tests, and deploying the code to one or more environments. This is typically done using a variety of scripts and build machines. The build machines in these cases would have the tools available to run the whole build and deploy process. This may be acceptable for a single build but is unacceptable if scaling to many different projects because it may become difficult to manage the list of requirements on a single machine.

In some examples, a single and relatively large build image is maintained that contains all of the supported software used as part of the build. To install additional software, for example, additional scripts would install the necessary software at runtime, which may be undesirable.

SUMMARY

Shortcomings of the prior art are overcome and additional advantages are provided through the provision of a computer-implemented method. The method obtains a configuration for an automated process that includes a plurality of discrete tasks. The configuration specifies a corresponding container image, of a plurality of different container images, for each discrete task of the plurality of discrete tasks, and further specifies a sequence in which to instantiate a plurality of containers from the plurality of container images to perform the plurality of discrete tasks and complete the automated process. The method identifies from the configuration a next container image, of the plurality of container images, from which to instantiate a next container, of the plurality of containers, for execution to perform a next discrete task of the plurality of discrete tasks, the next discrete task corresponding to the next container image and next container instantiated from the next container image. The method initiates instantiation of the next container from the next container image to initiate execution of the container to perform the next discrete task. The method also repeats the identifying and the initiating instantiation for each next container image of the plurality of container images.

Further, a computer system is provided that includes a memory and a processor in communications with the memory, wherein the computer system is configured to perform a method. The method obtains a configuration for an automated process that includes a plurality of discrete tasks. The configuration specifies a corresponding container image, of a plurality of different container images, for each discrete task of the plurality of discrete tasks, and further specifies a sequence in which to instantiate a plurality of containers from the plurality of container images to perform the plurality of discrete tasks and complete the automated process. The method identifies from the configuration a next container image, of the plurality of container images, from which to instantiate a next container, of the plurality of containers, for execution to perform a next discrete task of the plurality of discrete tasks, the next discrete task corresponding to the next container image and next container instantiated from the next container image. The method initiates instantiation of the next container from the next container image to initiate execution of the container to perform the next discrete task. The method also repeats the identifying and the initiating instantiation for each next container image of the plurality of container images.

Yet further, a computer program product including a computer readable storage medium readable by a processor and storing instructions for execution by the processor is provided for performing a method. The method obtains a configuration for an automated process that includes a plurality of discrete tasks. The configuration specifies a corresponding container image, of a plurality of different container images, for each discrete task of the plurality of discrete tasks, and further specifies a sequence in which to instantiate a plurality of containers from the plurality of container images to perform the plurality of discrete tasks and complete the automated process. The method identifies from the configuration a next container image, of the plurality of container images, from which to instantiate a next container, of the plurality of containers, for execution to perform a next discrete task of the plurality of discrete tasks, the next discrete task corresponding to the next container image and next container instantiated from the next container image. The method initiates instantiation of the next container from the next container image to initiate execution of the container to perform the next discrete task. The method also repeats the identifying and the initiating instantiation for each next container image of the plurality of container images.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
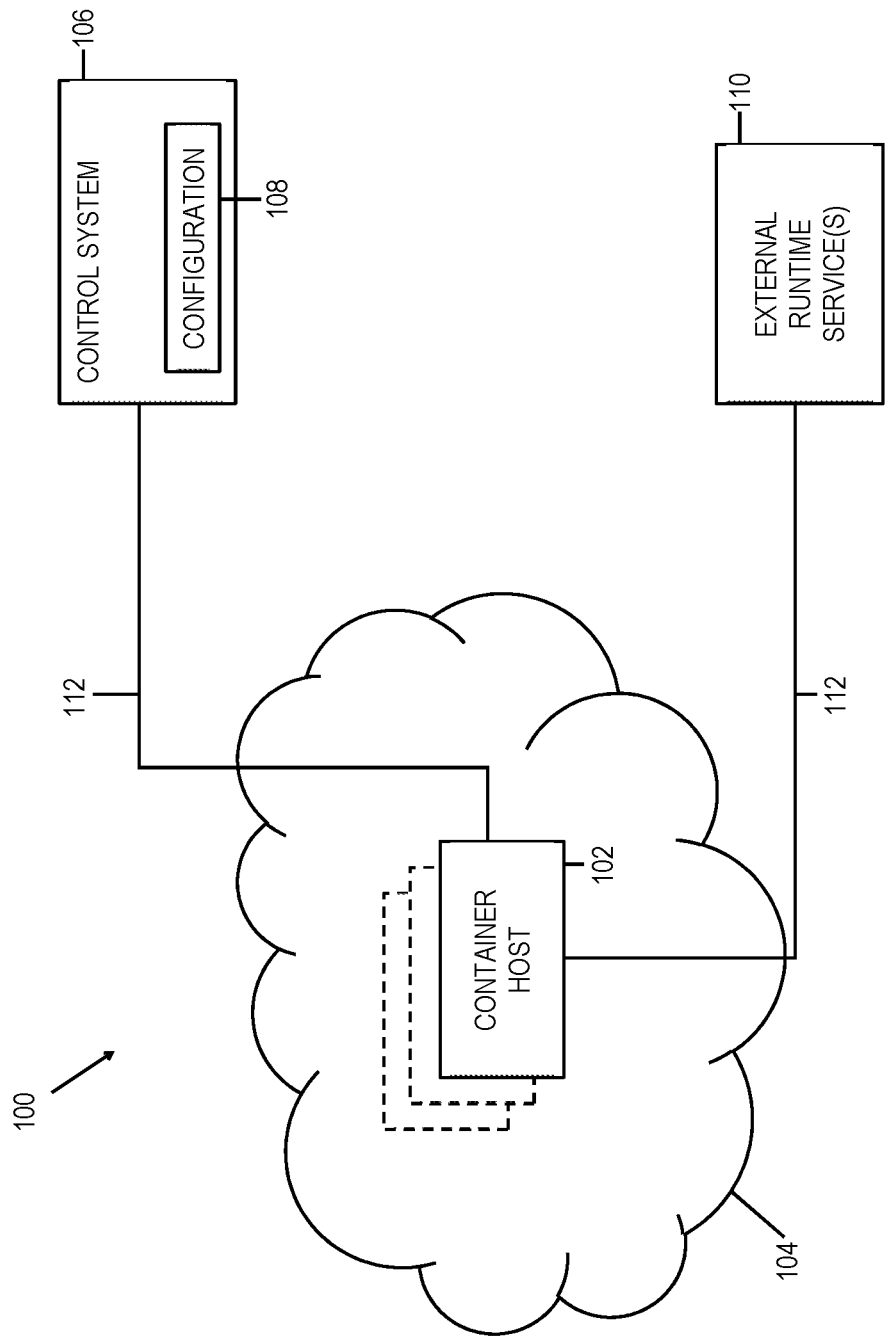
FIG. 1 depicts an example environment to incorporate and use aspects described herein.

Containers are virtual environments providing portability to a set of encapsulated applications. Docker (offered by Docker Inc, San Francisco, Calif., U.S.A.), and Windows Containers (offered by Microsoft Corp., Redmond, Wash., U.S.A.) are two examples of container-based virtualization offerings. A container is instantiated from a container image by a container engine or host that provides a runtime environment for the image. Much like a virtual machine, a container can be stopped/paused and started when needed, though containers are generally lighter-weight than virtual machines.

Described herein are approaches for automated processing by chaining execution of multiple containers, each directed to the performance of a discrete task of the process. Examples provided in the following description focus on a software build and deployment process, though this is for purposes of example only and are not limiting on the types of automated processes that may be accomplished by container chaining approaches described herein.

Specifically, aspects chain together processing of a set of containers to complete a software build and deploy process. A control system instantiate each container from a respective container image of the container images. Each container is custom made for its part of the process. For instance, the desired tools, executables, and/or data, or the like, are installed into the container image and available to the container when instantiated from the container image, in order to complete the focused task that the container is to perform. By way of example, in a build process one container may execute to obtain the source code for the software from some repository, another container may execute to build and test, another container may execute to perform a Java® or other compile (JAVA is a registered trademark of Oracle Corporation, Redwood Shores, Calif., U.S.A.), and another container may execute to deploy the software to an appropriate cloud platform or other target. Thus, each container image may include the necessary.exe or other software to accomplish the specific task to which it is directed, and in some examples the image need not include extraneous components. This allows the container image to remain relatively lightweight, in some examples 10 megabytes or smaller depending on the particular task(s) the container is to perform. Meanwhile, the container may be relatively short-lived in terms of how long it remains started because it can be exited after it performs it part of the larger process.

This is in contrast to an approach where a relatively large container image is assembled having all of the software and tools to perform every task of the process. In that approach, the container starts, the discrete tasks thereof complete to complete the process, and the container exits. The container is not exited or destroyed until the software build process (using the example above) completes. In fact, destroying the container prior to performance of all of the tasks of the automated process would mean the build by definition does not complete. Furthermore, any changes to be made to the containerized components needed to complete any task of the process necessitates that the large image be modified.

In contrast, a more granular chained container approach described herein allows a configuration to specify the necessary containers to complete the specific tasks of the process, with each container being directed to performance of its respective task. In any changes are needed to a task, the specific container image to of the container to perform the task may be targeted to effect the change, rather than having to change an entire monolithic container image as in the above approach. In this manner, if there is a need to implement bug fixes, support a new feature, or make any other changes to tasks of the process, the appropriate container image may be modified to effect the change and this need not affect any other container image. Similarly, if a discrete task is to be added or removed from the process, the appropriate container image is inserted into or removed from the sequence as the case may be without having to modify any of the other container images.

FIG. 1 depicts an example environment 100 to incorporate and use aspects described herein. Environment 100 includes container hosts 102 providing facilities for at least container execution, and in some cases a repository/registry for container images. The container hosts 102 are themselves hosted in a cloud environment 104 or other network infrastructure. A control system 106 communicates with the container hosts(s) 102 via the internet or other network(s) to manage the instantiation of containers on the container hosts from container images. During container execution, the container(s) may call one or more external runtime services 110 to support the process. External runtime services in the software build and deploy realm can include a git or other version control system repository, a package manger, a code or software test facility, a code compilation service, and/or a cloud hosting platform, as examples. For other automated processes, other types of external runtime services may be leveraged.

The components in FIG. 1 form wired or wireless network(s) of devices, and communication between the devices takes place via wired or wireless communications links 112 for communicating data between the devices. FIG. 1 is just one example of an environment to incorporate and use aspects described herein; many other examples are possible and contemplated as being compatible with the capabilities described herein.

In a typical example, the control system 106 reads a configuration 108 for the automated process, which specifies, for instance via URLs or other identifiers, a plurality of container images. The plurality of container images can include a container image for each discrete task of the process. The control system 106 identifies a first container image from which to initiate instantiation and starting of a first container to perform the first discrete task of the process. The initiating the instantiation may be the sending of a call or other command from the control system 106 to a container host 102 or management system thereof. The call/command can direct the container host to instantiate the container in the container host from the container image. The container host obtains the image from a repository local or remote to the container host. In some examples, the configuration 108 specifies parameters to use in instantiating one or more containers. The container host causes the container to exit once the discrete task is completed.

The control system 106 may receive from the container host a result of the container's execution or an indication that the container has completed execution and use this to trigger the next container, i.e. initiate instantiation of a next container from another container image specified in the configuration. In this manner, the execution of the containers may be 'chained' in a sequence.

A container may be destroyed after it performs its discrete task and exits. This is the case even though the automated process is not yet complete. Because subsequent container(s) perform the remaining tasks of the process, there is no longer any use to the container that just ran and completed its part of the process.

The chain can also incorporate containers from external groups or services. For instance, a website might expose a container image for performing a widget build by publishing its container image to a container registry or repository, thereby enabling others to invoke the container as part of a software build process that includes building a widget for the software.

In a particular example, a process looks at a project in a source code manager/repository such as Github and obtains a configuration file that describes the containers through which to pass the code. The process may be performed by a control system, with the containers being run on container hosts(s), as in FIG. 1. This provides the ability to scale out multiple jobs managed by a single control system. Additionally or alternatively, in some examples different container hosts run different containers performing tasks of the overall process.

The configuration may be specified by an administrator, developer, or other user and provided to the controller. The configuration may take on any format and include any desired information, though in a particular example it provides a list/sequence of containers and/or container images along with any parameters for their execution, such as authentication or account information to use in executing the container.

Figure 2:
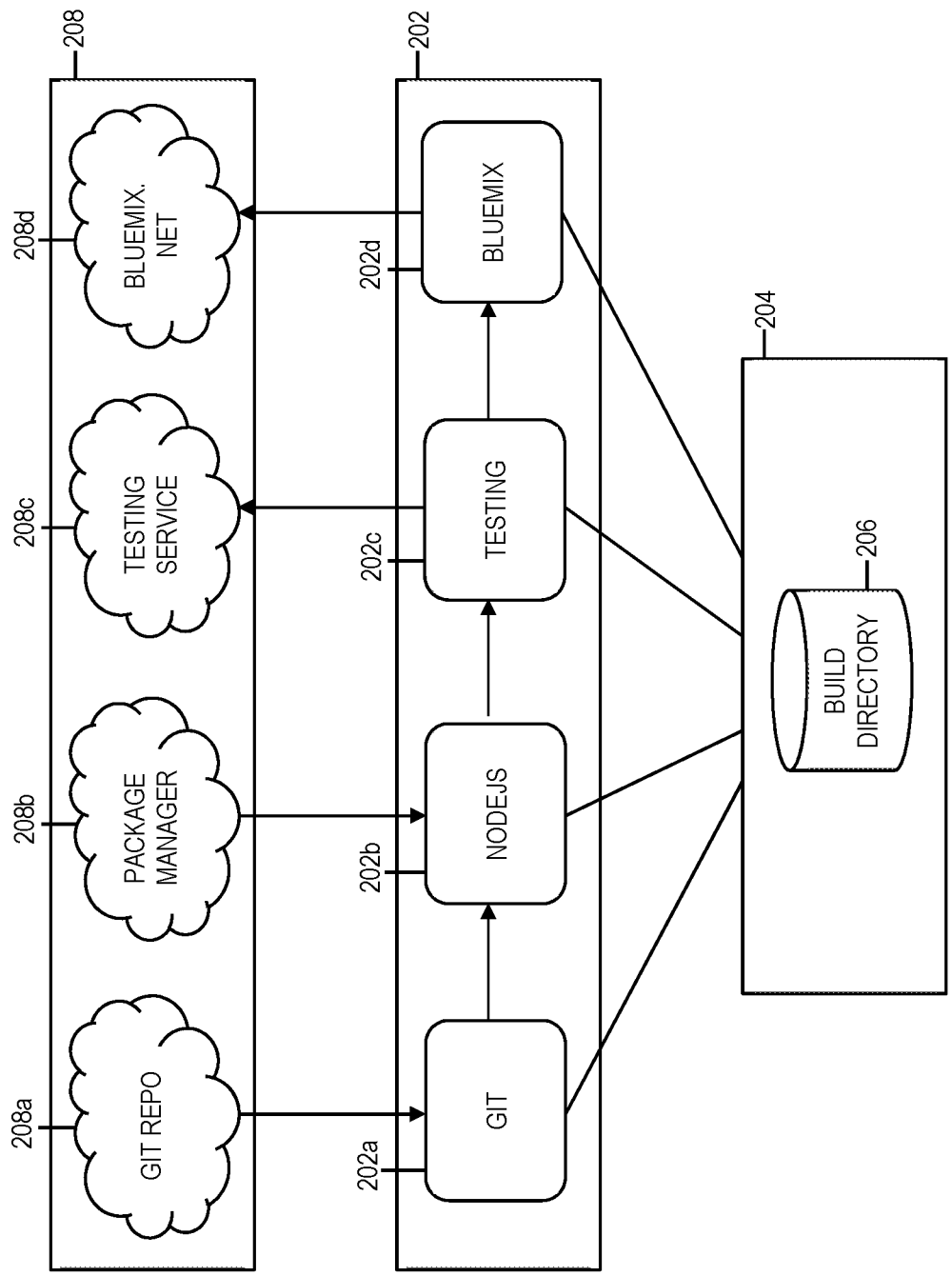
FIG. 2 depicts an example conceptual layout of process automation using chained containers for a software build and deploy process, in accordance with aspects described herein.

FIG. 2 depicts an example conceptual layout of process automation using chained containers for a software build and deploy automated process, in accordance with aspects described herein. The focus of the conceptual layout is containers 202, which in this example include four containers performing respective GIT, NodeJS, Testing, and cloud-deployment-related activities described in further detail below.

Initially, the control system creates a shared working volume 204 either at a container host, container host facility, or any other desired location accessible to the containers during their execution. The shared working volume includes a build directory 206 for the build. The build directory provides a location to record the state of the process and any information generated as a result of performing the process. This would typically include data, log files, compiled code, etc. for a build and deploy automated process. By the nature of container execution, they are compartmentalized and isolated from each other, and in many examples the containers are unable to pass data directly between each other even if running simultaneously. Consequently, the control system provides the shared working volume and makes it available for access (read and/or write) by the containers so that they can pass data between each other. This enables the executing containers to see the changes made by other containers. The volume/build directory can be mounted as a volume or directory in the container when started. The container and optionally the external runtime services have access to the shared working volume to retrieve data from it and write data back to it.

In some examples, the volume 204 is created as an encrypted volume and each container is provided at least one key for decrypting data from the shared working volume. When the volume is mapped into the container, the container itself could decrypt the data from the volume, on-the-fly in some instances.

The control system then initiates a process that proceeds through the sequence of containers by initiating the instantiation of the containers at the container host(s) from the container images specified by the configuration. Each container is configured with items it uses to effect its discrete task of the process. This might involve reaching out to one or more external services 208, in which case each container will know by way of whatever configuration of the container is needed how to 'talk' to those service(s) that it leverages. In some examples, this involves installation of a command in the container along with any necessary dependencies.

The first container 202a to be instantiated is created from an image that has the "git" command installed into it. Execution of this container executes the git command to pull the source code down to the build directory from a git repository 208a. The "git clone" command as one example is executed with a URL to the code in an SCM, the URL being specified in the configuration (FIG. 1, #108) as a parameter that is fed to the container to use as a parameter of the git command. The git clone command clones the code into the build directory on the shared working volume. In other examples, the source code is pulled from a flash drive, ftp server, or another code repository.

Upon exit of the GIT container 202a, the control system initiates the instantiation of the next container, the NodeJS container 202b. There are typically dependencies like libraries relied upon by software. For a node application in this example, the NodeJS container looks at a file and downloads the necessary dependencies from a package manager 208b, for instance using the npm command. These may then be placed into the source tree.

This process of initiating the next container iterates for each container in the sequence to perform its specific task and make changes to the build directory as needed. Thus, after the NodeJS container executes, the control manager initiates instantiation of a testing container 202c to make a remote call to a testing service 208c to run particular tests(s) that may have been predefined. In this example, the testing service 208c connects to a website or other facility where the web application resides and mimics user behavior to test the application.

Finally, the last container 202d titled Bluemix refers to the Bluemix cloud platform offered by International Business Machines Corporation (of which BLUEMIX is a registered trademark). The BlueMix container 202d is responsible for publishing the application as a web application to a cloud facility external service 208d, in this example a cloud facility hosted at BlueMix.net using a cf (Cloud Foundry) push command as one example. Exiting the BlueMix container ends the automated process, after which the application has been built and deployed.

In the above example, the control containers are instantiated and exited in a series, though it may be possible that two or more of the containers execute contemporaneously/simultaneously—that is, at least partially overlapping in their execution timeframes, if it makes sense to do so. By way of example, if the automated build process involves a compile for five different platforms, the control system might initiate the instantiation of five different containers, each directed to a respective specific compile of the five, to run simultaneously and perform the different compiles for the build.

Modification of the automated process to delete or change a container is a matter of targeting the specific container itself for the change or deletion. In the case of a change, the relatively lightweight container is modified as desired without having to modify any of the other containers. If in FIG. 2 a different testing service were desired, the testing container 202c could be modified without touching any of the other containers. In the case of a deletion, the configuration file on the control system may be modified to remove the target container from the chain. The addition of process aspects is made easy as well by editing the configuration to reference the new container image(s) to implement these added process aspects.

As an additional aspect, the system may have the ability to recover from a failure of a container to properly perform its discrete task. During container execution, the container may change the state of the shared working volume, for example by making changes to the data of the volume. If a container fails or there is otherwise a failure in the performance of the discrete task that the container is to perform, a new container instance may be established with a "snapshot" of the shared working volume state as it existed prior to the failed container's modification to the state of the shared working volume. By way of example, assume a container is executing to perform its task and, in so doing, modifies data on the shared filesystem. Assume also that the task fails in a partially complete state due to a compute, network, software, or other failure. The control system can detect the failure and spawn a new instance of the container worker, restoring the shared working volume back to the state it was in prior to offering it to the failed container. In this manner, the control system can, based on receiving an indication that performance of the task corresponding to a container has failed, restore the shared working volume to a prior state of the shared working volume as it existed prior to the instantiation of that container, and reinitiate the instantiation of the container to reinitiate execution of the container to perform the task.

Figure 3:
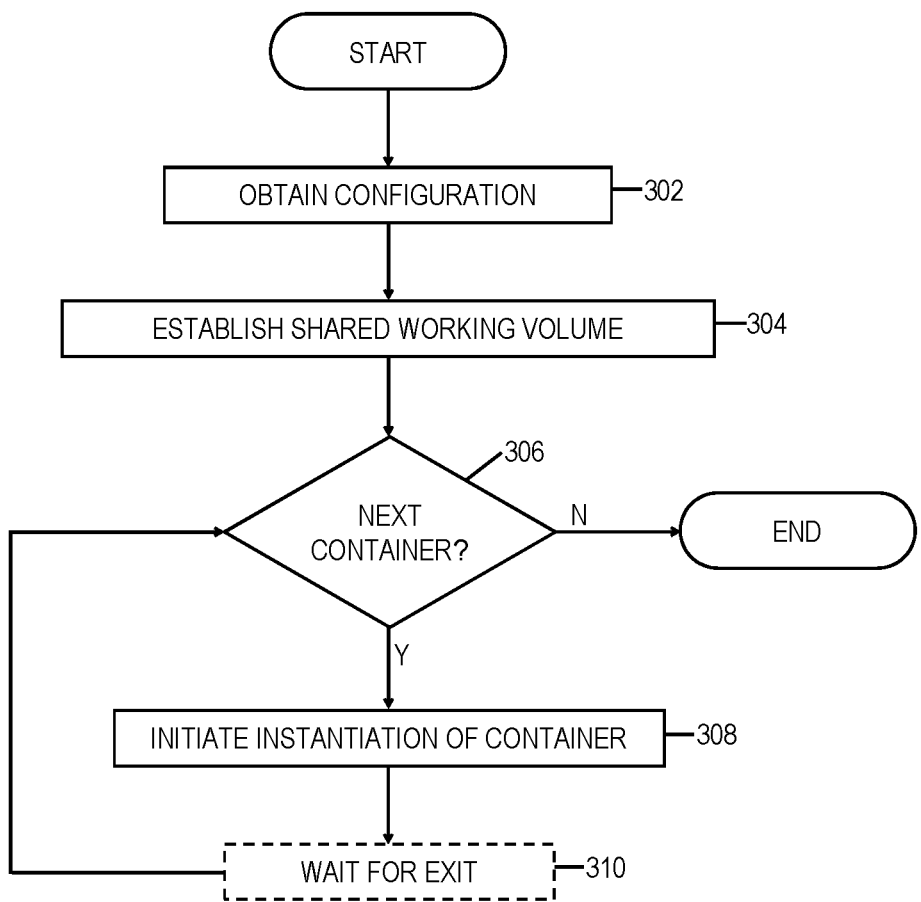
FIG. 3 depicts an example process of container chaining for automated process completion, in accordance with aspects described herein.

FIG. 3 depicts an example process of container chaining for automated process completion, in accordance with aspects described herein. In some examples, the process is performed by one or more computer systems, such as those described herein, which may include one or more controllers, control systems, cloud-based computer systems, and/or one or more other computer systems.

The process begins by obtaining a configuration for an automated process that includes a plurality of discrete tasks (302). The configuration specifies a corresponding container image, of a plurality of different container images, for each discrete task of the plurality of discrete tasks. Thus, if there are four discrete tasks of the automated process, the configuration could specify four container images, with each different container image corresponding to a different task of the four. The configuration further specifies, explicitly or by implication for instance based on the arrangement of the information in the configuration, a sequence in which to instantiate a plurality of containers from the plurality of container images to perform the plurality of discrete tasks and complete the automated process. In addition, the configuration can specify, for a container image from which a container of the plurality of containers is instantiated, at least one parameter to use in instantiating the container from the container image.

The process also establishes a shared working volume (304) for the plurality of containers that may be used to pass data from one container to another. The process can provide the plurality of containers access to the shared working volume, where one or more containers is/are configured to write data to the shared working volume and one or more containers is/are configured to read the written data from the shared working volume. Providing a container access to the shared working volume can include configuring mounting of (i.e. causing the container host to mount) the shared working volume as a directory of the container. In some cases, establishing the shared working volume establishes the shared working volume as an encrypted volume, and the process provides each container of the plurality of containers at least one key for decrypting data from the shared working volume.

The process then enters an iterative loop that includes a determination as to whether there is a next container to instantiate (306). The process identifies from the configuration a next container image, of the plurality of container images, from which to instantiate a next container, of the plurality of containers, for execution to perform a next discrete task of the plurality of discrete tasks of the automated process. The next discrete task to perform corresponds to the next container image and next container instantiated from that next container image. That is, the next discrete task is performed by execution of the corresponding container, which is instantiated from the corresponding container image identified from the configuration.

If there is a next container to instantiate (306, Y), the process initiates instantiation of the next container (308) from the next container image in order to initiate execution of the container to perform the next discrete task. The process then optionally awaits receipt of an indication of a container exit (310), i.e. that execution of the container has terminated, for instance after performing the discrete task corresponding to that container. This may be optional because, at least at times, it may be desired to instantiate more than one container for simultaneous execution, in which case it is not desired to wait for the exit (310) of the container that was just instantiated.

Based on obtaining the indication of an exit (310), or if no indication is being awaited, then the process initiates a next iteration of the identifying and the initiating instantiation to instantiate another container of the plurality of containers. The iterating continues to instantiate a respective container from each container image identified in the configuration. Thus, the process repeats by returning to 306 to determine whether there is a next container to instantiate (306) and, if so, identify the corresponding next container image, then initiate instantiation for the next container (308). This repeats to instantiate each next container image of the plurality of container images.

At some point there is no next container to instantiate (306, N), and the process will end in any desired fashion, which may include performing logging or any other action.

In some examples, based on receiving an indication that performance of the discrete task corresponding to one container of the plurality of containers has failed, the one container having been instantiated to initiate execution of the one container to perform the discrete task, the process can restore the shared working volume to a prior state of the shared working volume as it existed prior to the instantiation of the one container, and reinitiate the instantiation of the one container to reinitiate execution of that container to perform the discrete task. This indication may come after instantiating the container (308) and waiting (310) for termination or other exit/return of the container, as an example.

A process can make modifications on behalf of an administrator or other user to the automated process carried out by operation of the containers by adding another discrete task. The modifying in that scenario can include modifying the configuration to specify another container image from which to instantiate another container, the another container for execution to perform the another discrete task. Modification of the automated process to add the another discrete task can modify the automated process absent/without changing the plurality of container images, for instance absent modifying or even accessing/opening any of the other containers.

Additionally or alternatively, a process can modify on behalf of an administrator or other user a discrete task of the plurality of discrete tasks of the automated process by modifying or replacing the container image, of the plurality of container images, to which the discrete task corresponds. In this scenario, the modifying or replacing the container image modifies or replaces the container image absent/without changing other container images of the plurality of container images.

As part of repeating the identification and initiating instantiation, the process can initiate instantiation of at least two containers of the plurality of containers for contemporaneous execution to perform aspects of the automated process.

In some embodiments, the obtaining, identifying, initiating, and repeating are performed by a control system that controls the automated process, and the execution of the plurality of containers is performed by a container runtime environment running one or more container hosts on which the plurality of containers execute, as seen in FIG. 1.

In a particular example, the automated process includes a build process that produces and deploys executable software. The build process can include at least discrete tasks of obtaining code, building the executable software from the code, and deploying the executable software to a web application hosting environment. The configuration could specify a sequence of container images to sequentially instantiate (and optionally others that may be execute simultaneous to one or more of the sequentially-instantiated containers). The sequence of containers can include a container configured to execute to perform the obtaining the code, a container configured to execute to perform the building the executable software, and a container configured to execute to perform the deploying the executable software. The identifying the next container image, initiating the instantiation, and the repeating in this situation can include (i) initiating the instantiation of the container configured to execute to perform the obtaining the code, then (ii) after termination of execution of the container configured to execute to perform the obtaining the code, initiating the instantiation of the container configured to perform the building the executable software from the code, and (iii) after termination of execution of the container configured to execute to perform the building the executable software, initiating the instantiation of the container configured to perform the deploying the executable software to the web application hosting environment.

Although various examples are provided, variations are possible without departing from a spirit of the claimed aspects.

Figure 4:
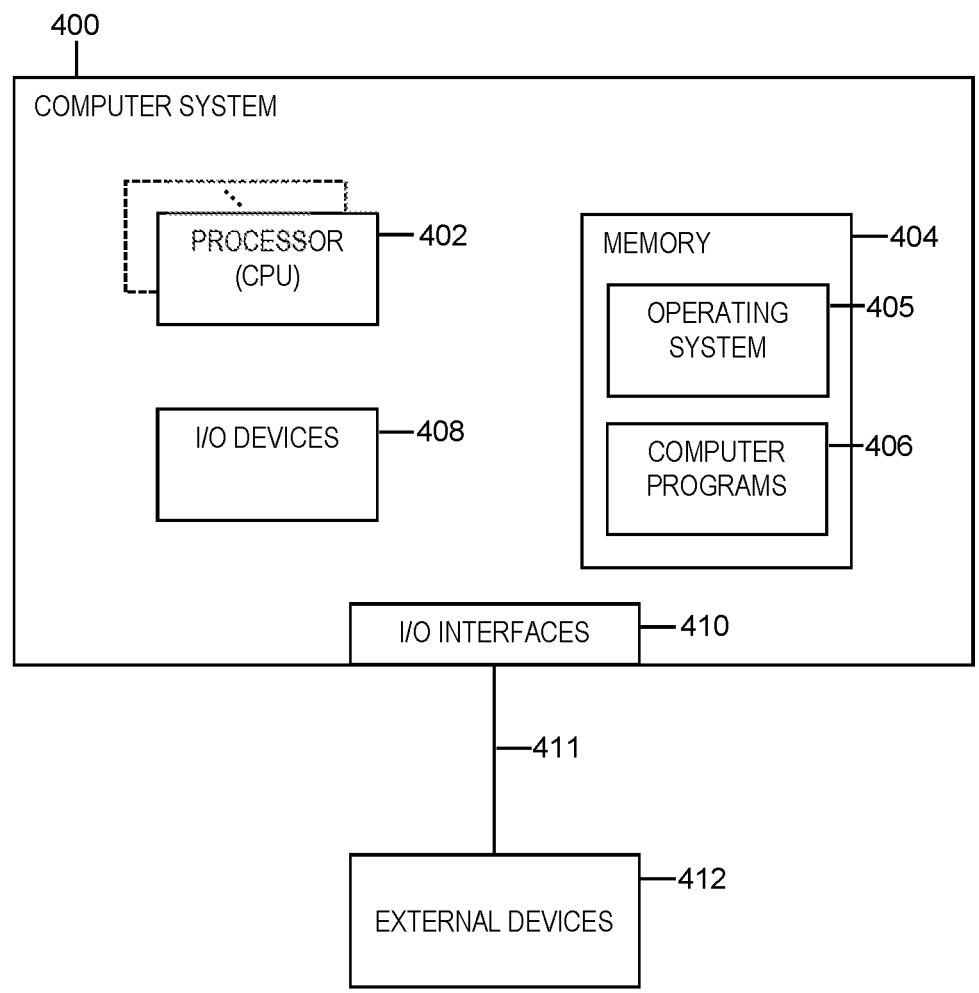
FIG. 4 depicts one example of a computer system and associated devices to incorporate and/or use aspects described herein.

Processes described herein may be performed singly or collectively by one or more computer systems, such as those described herein, which may include one or more controllers, control systems, cloud-based computer systems, and/or one of more other computer systems. FIG. 4 depicts one example of such a computer system and associated devices to incorporate and/or use aspects described herein. A computer system may also be referred to herein as a data processing device/system, computing device/system/node, or simply a computer. The computer system may be based on one or more of various system architectures and/or instruction set architectures, such as those offered by International Business Machines Corporation (Armonk, N.Y., USA), Intel Corporation (Santa Clara, Calif., USA) or ARM Holdings plc (Cambridge, England, United Kingdom), as examples.

FIG. 4 shows a computer system 400 in communication with external device(s) 412. Computer system 400 includes one or more processor(s) 402, for instance central processing unit(s) (CPUs). A processor can include functional components used in the execution of instructions, such as functional components to fetch program instructions from locations such as cache or main memory, decode program instructions, and execute program instructions, access memory for instruction execution, and write results of the executed instructions. A processor 402 can also include register(s) to be used by one or more of the functional components. Computer system 400 also includes memory 404, input/output (I/O) devices 408, and I/O interfaces 410, which may be coupled to processor(s) 402 and each other via one or more buses and/or other connections. Bus connections represent one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 404 can be or include main or system memory (e.g. Random Access Memory) used in the execution of program instructions, storage device(s) such as hard drive(s), flash media, or optical media as examples, and/or cache memory, as examples. Memory 404 can include, for instance, a cache, such as a shared cache, which may be coupled to local caches (examples include L1 cache, L2 cache, etc.) of processor(s) 402. Additionally, memory 404 may be or include at least one computer program product having a set (e.g., at least one) of program modules, instructions, code or the like that is/are configured to carry out functions of embodiments described herein when executed by one or more processors.

Memory 404 can store an operating system 405 and other computer programs 406, such as one or more computer programs/applications that execute to perform aspects described herein. Specifically, programs/applications can include computer readable program instructions that may be configured to carry out functions of embodiments of aspects described herein.

Examples of I/O devices 408 include but are not limited to microphones, speakers, Global Positioning System (GPS) devices, cameras, lights, accelerometers, gyroscopes, magnetometers, sensor devices configured to sense light, proximity, heart rate, body and/or ambient temperature, blood pressure, and/or skin resistance, and activity monitors. An I/O device may be incorporated into the computer system as shown, though in some embodiments an I/O device may be regarded as an external device (412) coupled to the computer system through one or more I/O interfaces 410.

Computer system 400 may communicate with one or more external devices 412 via one or more I/O interfaces 410. Example external devices include a keyboard, a pointing device, a display, and/or any other devices that enable a user to interact with computer system 400. Other example external devices include any device that enables computer system 400 to communicate with one or more other computing systems or peripheral devices such as a printer. A network interface/adapter is an example I/O interface that enables computer system 400 to communicate with one or more networks, such as a local area network (LAN), a general wide area network (WAN), and/or a public network (e.g., the Internet), providing communication with other computing devices or systems, storage devices, or the like. Ethernet-based (such as Wi-Fi) interfaces and Bluetooth® adapters are just examples of the currently available types of network adapters used in computer systems (BLUETOOTH is a registered trademark of Bluetooth SIG, Inc., Kirkland, Wash., U.S.A.).

The communication between I/O interfaces 410 and external devices 412 can occur across wired and/or wireless communications link(s) 411, such as Ethernet-based wired or wireless connections. Example wireless connections include cellular, Wi-Fi, Bluetooth®, proximity-based, near-field, or other types of wireless connections. More generally, communications link(s) 411 may be any appropriate wireless and/or wired communication link(s) for communicating data.

Particular external device(s) 412 may include one or more data storage devices, which may store one or more programs, one or more computer readable program instructions, and/or data, etc. Computer system 400 may include and/or be coupled to and in communication with (e.g. as an external device of the computer system) removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media.

Computer system 400 may be operational with numerous other general purpose or special purpose computing system environments or configurations. Computer system 400 may take any of various forms, well-known examples of which include, but are not limited to, personal computer (PC) system(s), server computer system(s), such as messaging server(s), thin client(s), thick client(s), workstation(s), laptop(s), handheld device(s), mobile device(s)/computer(s) such as smartphone(s), tablet(s), and wearable device(s), multiprocessor system(s), microprocessor-based system(s), telephony device(s), network appliance(s) (such as edge appliance(s)), virtualization device(s), storage controller(s), set top box(es), programmable consumer electronic(s), network PC(s), minicomputer system(s), mainframe computer system(s), and distributed cloud computing environment(s) that include any of the above systems or devices, and the like.

Aspects described herein may be incorporated into and/or use a cloud computing environment. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes. One such node is node 10 depicted in FIG. 5.

Computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

Figure 5:
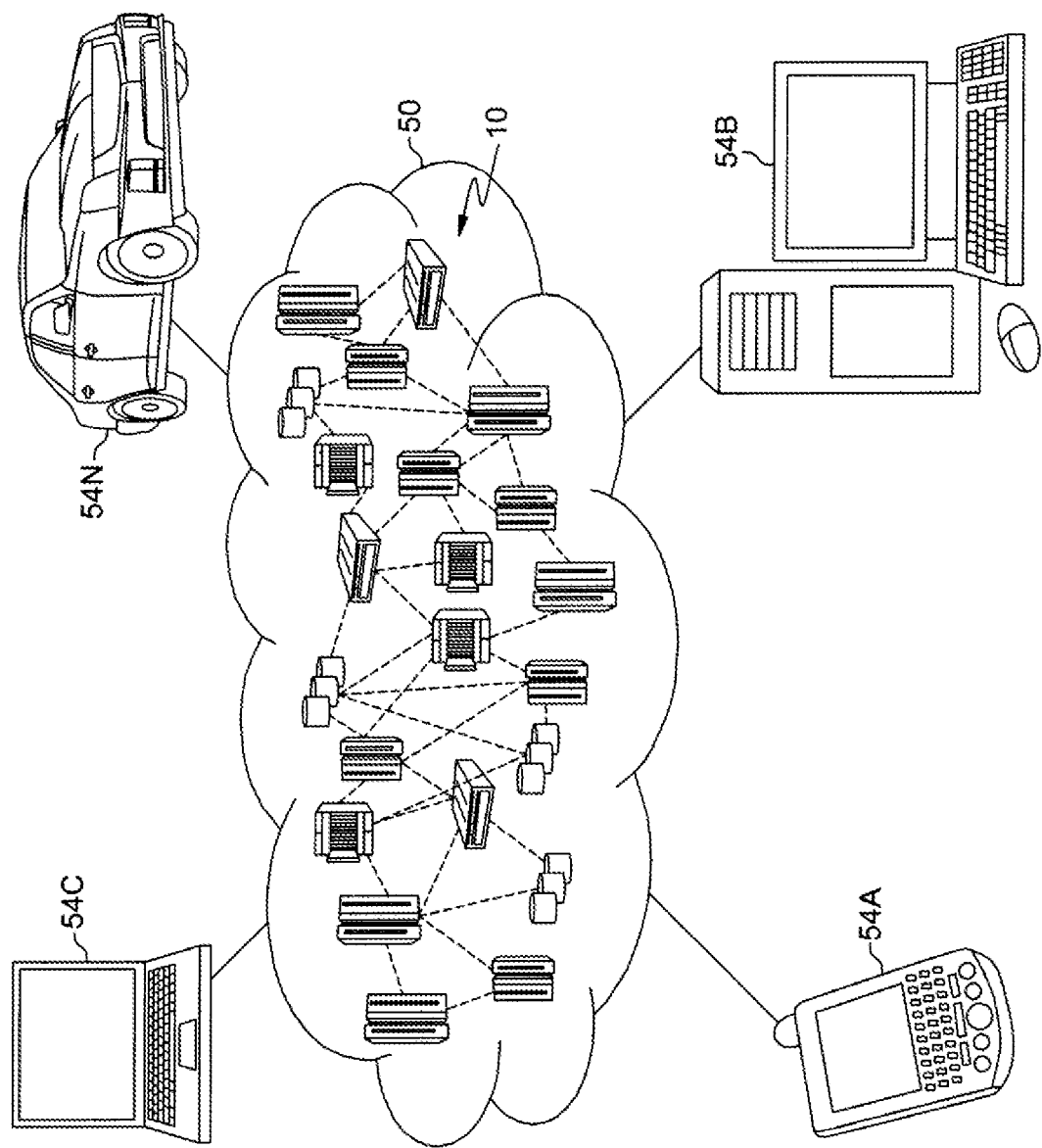
FIG. 5 depicts a cloud computing environment according to an embodiment of the present invention.

Referring now to FIG. 5, illustrative cloud computing environment 50 is depicted. As shown, cloud computing environment 50 comprises one or more computing nodes 10 with which local computing devices used by cloud consumers, such as, for example, smartphone or other mobile device 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
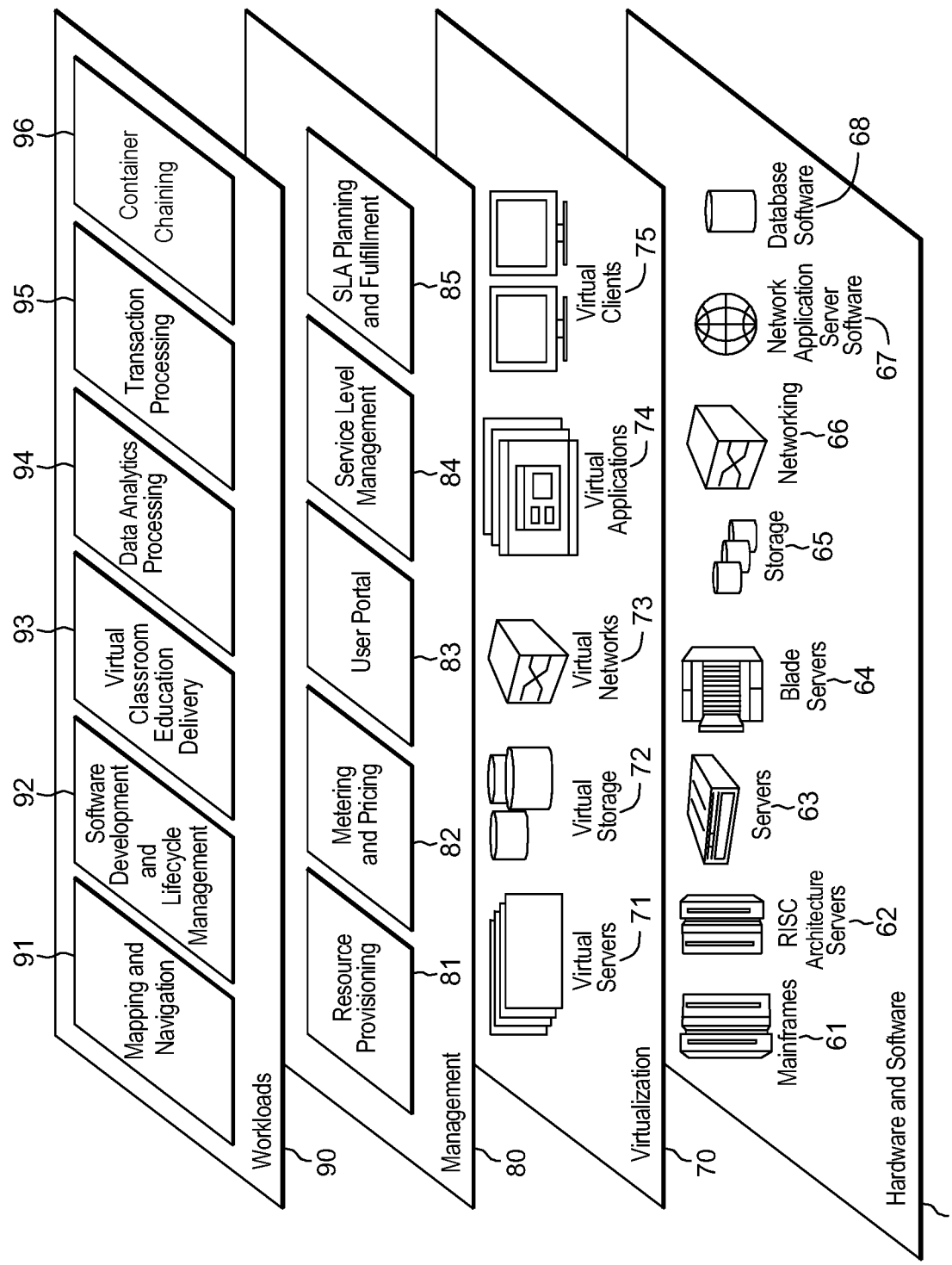
FIG. 6 depicts abstraction model layers according to an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and container chaining as described herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
    obtaining a configuration for an automated process comprising a plurality of discrete tasks, the configuration specifying a corresponding container image, of a plurality of different container images, for each discrete task of the plurality of discrete tasks, and further specifying a sequence in which to instantiate a plurality of containers from the plurality of container images to perform the plurality of discrete tasks and complete the automated process;

modifying the automated process to add another discrete task, wherein the modifying comprises modifying the configuration to specify another container image from which to instantiate another container, the another container for execution to perform the another discrete task, wherein the modifying the automated process to add the another discrete task modifies the automated process absent (i) changing the plurality of container images specified and (ii) replacing the plurality of container images specified in the configuration for the automated process;

identifying from the configuration a next container image, of the plurality of container images, from which to instantiate a next container, of the plurality of containers, for execution to perform a next discrete task of the plurality of discrete tasks, the next discrete task corresponding to the next container image and next container instantiated from the next container image;

initiating instantiation of the next container from the next container image to initiate execution of the container to perform the next discrete task;

repeating the identifying and the initiating instantiation for each next container image of the plurality of container images; and establishing a shared working volume for the plurality of containers and providing the plurality of containers access to the shared working volume, wherein at least one container of the plurality of containers is configured to write data to the shared working volume and at least one other container of the plurality of containers is configured to read the written data from the shared working volume, wherein the establishing establishes the shared working volume as an encrypted volume, and wherein the method further comprises providing each container of the plurality of containers at least one key for decrypting data from the shared working volume.

2. The method of claim 1, wherein the repeating comprises:
awaiting receipt of an indication that execution of one container of the plurality of containers has terminated after performing the discrete task corresponding to the one container; and
based on receiving the indication that the execution of the one container has terminated, initiating a next iteration of the identifying and the initiating instantiation to instantiate another container, of the plurality of containers.

3. The method of claim 1, further comprising modifying a discrete task of the plurality of discrete tasks, the modifying comprising modifying or replacing the container image, of the plurality of container images, to which the discrete task corresponds, wherein the modifying or replacing the container image modifies or replaces the container image absent changing other container images of the plurality of container images.

4. The method of claim 1, wherein the configuration further specifies, for a container image of the plurality of container images from which a container of the plurality of containers is instantiated, at least one parameter to use in instantiating the container from the container image.

5. The method of claim 1, further comprising:
based on receiving an indication that performance of the discrete task corresponding to one container of the plurality of containers has failed, the one container having been instantiated to initiate execution of the one container to perform the discrete task, restoring the shared working volume to a prior state of the shared working volume as it existed prior to the instantiation of the one container; and
reinitiating instantiation of the one container to reinitiate execution of the container to perform the discrete task.

6. The method of claim 1, wherein providing a container of the plurality of containers access to the shared working volume comprises configuring mounting of the shared working volume as a directory of the container.

7. The method of claim 1, wherein the repeating initiates instantiation of at least two containers of the plurality of containers for contemporaneous execution to perform aspects of the automated process.

8. A computer system comprising:
a memory; and
a processor in communication with the memory, wherein the computer system is configured to perform a method comprising:
obtaining a configuration for an automated process comprising a plurality of discrete tasks, the configuration specifying a corresponding container image, of a plurality of different container images, for each discrete task of the plurality of discrete tasks, and further specifying a sequence in which to instantiate a plurality of containers from the plurality of container images to perform the plurality of discrete tasks and complete the automated process;
identifying from the configuration a next container image, of the plurality of container images, from which to instantiate a next container, of the plurality of containers, for execution to perform a next discrete task of the plurality of discrete tasks, the next discrete task corresponding to the next container image and next container instantiated from the next container image;
initiating instantiation of the next container from the next container image to initiate execution of the container to perform the next discrete task; and
repeating the identifying and the initiating instantiation for each next container image of the plurality of container images, wherein the repeating comprises:
awaiting receipt of an indication that execution of one container of the plurality of containers has terminated after performing the discrete task corresponding to the one container; and
based on receiving the indication that the execution of the one container has terminated, initiating a next iteration of the identifying and the initiating instantiation to instantiate another container, of the plurality of containers, to perform another discrete task of the automated process, the another discrete task corresponding to the another container and being a different, and sequentially-next discrete task in the automated process relative to the discrete task corresponding to the one container.

9. The computer system of claim 8, wherein the method further comprises modifying the automated process to add another discrete task, wherein the modifying comprises modifying the configuration to specify another container image from which to instantiate another container, the another container for execution to perform the another discrete task, wherein the modifying the automated process to add the another discrete task modifies the automated process absent changing the plurality of container images.

10. The computer system of claim 8, wherein the method further comprises modifying a discrete task of the plurality of discrete tasks, the modifying comprising modifying or replacing the container image, of the plurality of container images, to which the discrete task corresponds, wherein the modifying or replacing the container image modifies or replaces the container image absent changing other container images of the plurality of container images.

11. The computer system of claim 8, wherein the method further comprises establishing a shared working volume for the plurality of containers and providing the plurality of containers access to the shared working volume, wherein at least one container of the plurality of containers is configured to write data to the shared working volume and at least one other container of the plurality of containers is configured to read the written data from the shared working volume.

12. A computer program product comprising:
a computer readable storage medium readable by a processor and storing instructions for execution by the processor for performing a method comprising:
obtaining a configuration for an automated process comprising a plurality of discrete tasks, the configuration specifying a corresponding container image, of a plurality of different container images, for each discrete task of the plurality of discrete tasks, and further specifying a sequence in which to instantiate a plurality of containers from the plurality of container images to perform the plurality of discrete tasks and complete the automated process;
identifying from the configuration a next container image, of the plurality of container images, from which to instantiate a next container, of the plurality of containers, for execution to perform a next discrete task of the plurality of discrete tasks, the next discrete task corresponding to the next container image and next container instantiated from the next container image;
initiating instantiation of the next container from the next container image to initiate execution of the container to perform the next discrete task; and
repeating the identifying and the initiating instantiation for each next container image of the plurality of container images, wherein the repeating comprises:
awaiting receipt of an indication that execution of one container of the plurality of containers has terminated after performing the discrete task corresponding to the one container; and
based on receiving the indication that the execution of the one container has terminated, initiating a next iteration of the identifying and the initiating instantiation to instantiate another container, of the plurality of containers, to perform another discrete task of the automated process, the another discrete task corresponding to the another container and being a different, and sequentially-next discrete task in the automated process relative to the discrete task corresponding to the one container.

13. The computer program product of claim 12, wherein the method further comprises modifying the automated process to add another discrete task, wherein the modifying comprises modifying the configuration to specify another container image from which to instantiate another container, the another container for execution to perform the another discrete task, wherein the modifying the automated process to add the another discrete task modifies the automated process absent changing the plurality of container images.

14. The computer program product of claim 12, wherein the method further comprises modifying a discrete task of the plurality of discrete tasks, the modifying comprising modifying or replacing the container image, of the plurality of container images, to which the discrete task corresponds, wherein the modifying or replacing the container image modifies or replaces the container image absent changing other container images of the plurality of container images.

15. The computer program product of claim 12, wherein the method further comprises establishing a shared working volume for the plurality of containers and providing the plurality of containers access to the shared working volume, wherein at least one container of the plurality of containers is configured to write data to the shared working volume and at least one other container of the plurality of containers is configured to read the written data from the shared working volume.

* * * * *